(12) United States Patent
Jing et al.

(10) Patent No.: US 10,400,109 B2
(45) Date of Patent: Sep. 3, 2019

(54) COATABLE COMPOSITION, ANTISTATIC COMPOSITION, ANTISTATIC ARTICLES, AND METHODS OF MAKING THE SAME

(71) Applicant: 3M INNOVATIVE PROPERTIES COMPANY, St. Paul, MN (US)

(72) Inventors: Naiyong Jing, Woodbury, MN (US); Xuan Jiang, Maplewood, MN (US); Justin A. Riddle, St. Paul, MN (US); Fuxia Sun, Woodbury, MN (US); Daniel J. Schmidt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 483 days.

(21) Appl. No.: 15/026,850

(22) PCT Filed: Oct. 4, 2013

(86) PCT No.: PCT/US2013/063449
§ 371 (c)(1),
(2) Date: Apr. 1, 2016

(87) PCT Pub. No.: WO2015/050560
PCT Pub. Date: Apr. 9, 2015

(65) Prior Publication Data
US 2016/0289454 A1 Oct. 6, 2016

(51) Int. Cl.
*C09D 1/00* (2006.01)
*C03C 17/23* (2006.01)
(Continued)

(52) U.S. Cl.
CPC ............... *C09D 1/00* (2013.01); *C03C 17/23* (2013.01); *C08J 7/06* (2013.01); *C09D 7/61* (2018.01);
(Continued)

(58) Field of Classification Search
None
See application file for complete search history.

(56) References Cited

U.S. PATENT DOCUMENTS

| 2,366,516 A | 1/1945 | Geffcken |
| 2,432,484 A | 12/1947 | Moulton |

(Continued)

FOREIGN PATENT DOCUMENTS

| CN | 101817531 | 9/2010 |
| CN | 101912948 | 12/2010 |

(Continued)

OTHER PUBLICATIONS

International Search Report for PCT International Application No. PCT/US2013/063449, dated Apr. 24, 2014, 4 pages.

(Continued)

*Primary Examiner* — Melvin C. Mayes
*Assistant Examiner* — Michael Forrest
(74) *Attorney, Agent, or Firm* — Bradford B. Wright

(57) ABSTRACT

A method of making a coatable composition includes: providing a first composition comprising silica nanoparticles dispersed in an aqueous liquid vehicle, wherein the first composition has a pH greater than 6; acidifying the first composition to a pH of less than or equal to 4 using inorganic acid to provide a second composition; and dissolving at least one metal compound in the second composition to form the coatable composition. The silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size. Coatable com- (Continued)

positions, antistatic compositions, preparable by the method are also disclosed. Soil-resistant articles including the antistatic compositions are also disclosed.

2 Claims, 1 Drawing Sheet

(51) Int. Cl.
  *C08J 7/06* (2006.01)
  *C09D 7/61* (2018.01)
  *C08K 3/36* (2006.01)
(52) U.S. Cl.
  CPC ....... *C03C 2218/11* (2013.01); *C08J 2367/03* (2013.01); *C08K 3/36* (2013.01)

(56) References Cited

U.S. PATENT DOCUMENTS

| | | | |
|---|---|---|---|
| 2,536,764 A | 1/1951 | Moulton | |
| 2,601,123 A | 6/1952 | Moulton | |
| 3,337,351 A | 8/1967 | Morehouse | |
| 3,507,897 A | 4/1970 | Kanner | |
| 4,152,165 A | 5/1979 | Langager | |
| 4,338,377 A | 7/1982 | Beck | |
| 4,816,333 A | 3/1989 | Lange | |
| 5,221,497 A | 6/1993 | Watanabe | |
| 5,494,738 A | 2/1996 | Van Thillo | |
| 5,585,186 A | 12/1996 | Scholz | |
| 5,597,512 A | 1/1997 | Watanabe | |
| 5,723,175 A | 3/1998 | Scholz | |
| 5,753,373 A | 5/1998 | Scholz | |
| 5,964,693 A | 10/1999 | Brekau | |
| 6,040,053 A | 3/2000 | Scholz | |
| 6,040,378 A | 3/2000 | Sanduja | |
| 6,352,780 B1 | 3/2002 | Sanduja | |
| 6,838,178 B1 | 1/2005 | Strickler | |
| 7,022,416 B2 | 4/2006 | Teranishi | |
| 7,957,621 B2 | 6/2011 | Zhang | |
| 8,163,388 B2 | 4/2012 | Do | |
| 2001/0051213 A1 | 12/2001 | Schulz | |
| 2006/0204655 A1 | 9/2006 | Takahashi | |
| 2007/0099005 A1* | 5/2007 | Leung | C08L 83/04 428/447 |
| 2010/0092765 A1 | 4/2010 | Hager | |
| 2010/0209946 A1 | 8/2010 | Jing | |
| 2011/0033694 A1 | 2/2011 | Jing | |
| 2012/0010327 A1 | 1/2012 | Jing | |
| 2012/0029141 A1 | 2/2012 | Jing | |
| 2012/0088106 A1 | 4/2012 | Jing | |
| 2012/0202684 A1 | 8/2012 | MacDonald | |
| 2013/0225760 A1 | 8/2013 | Jing | |

FOREIGN PATENT DOCUMENTS

| | | | |
|---|---|---|---|
| EP | 0444939 | 9/1991 | |
| EP | 2674449 | 12/2013 | |
| EP | 2674450 | 12/2013 | |
| JP | 59-015473 | 1/1984 | |
| JP | 60-044147 | 3/1985 | |
| JP | 60-044148 | 3/1985 | |
| JP | 60-044149 | 3/1985 | |
| JP | 6-172678 | 6/1994 | |
| KR | 2008-0014526 | 2/2008 | |
| KR | 2010-0053277 | 5/2010 | |
| KR | 10-1031518 | 4/2011 | |
| TK | 2014-052203 | 4/2014 | |
| WO | 2004-045494 | 6/2004 | |
| WO | 2004-079407 | 9/2004 | |
| WO | 2005-013337 | 2/2005 | |
| WO | 2007-018974 | 2/2007 | |
| WO | 2008-068154 | 6/2008 | |
| WO | 2009-009188 | 1/2009 | |
| WO | 2009-046081 | 4/2009 | |
| WO | 2009-108393 | 9/2009 | |
| WO | 2009-140482 | 11/2009 | |
| WO | 2010-017069 | 2/2010 | |
| WO | 2010-030552 | 3/2010 | |
| WO | 2010-042672 | 4/2010 | |
| WO | 2010-068275 | 6/2010 | |
| WO | 2010-077521 | 7/2010 | |
| WO | 2010-091802 | 8/2010 | |
| WO | 2010-114698 | 10/2010 | |
| WO | 2010-114700 | 10/2010 | |
| WO | 2010-124403 | 11/2010 | |
| WO | 2011-002838 | 1/2011 | |
| WO | 2011-037523 | 3/2011 | |
| WO | 2011-084661 | 7/2011 | |
| WO | 2011-087997 | 7/2011 | |
| WO | WO-2011084661 A2 * | 7/2011 | ............... C09D 1/00 |
| WO | 2011-142956 | 11/2011 | |
| WO | WO 2012/047422 A1 | 4/2012 | |
| WO | 2012-173803 | 12/2012 | |
| WO | 2013-089927 | 6/2013 | |
| WO | 2013-127054 | 6/2013 | |
| WO | 2013-188083 | 12/2013 | |
| WO | 2013-188121 | 12/2013 | |
| WO | 2014-008383 | 1/2014 | |
| WO | 2014-052072 | 4/2014 | |
| WO | 2014-052074 | 4/2014 | |
| WO | 2014-052202 | 4/2014 | |

OTHER PUBLICATIONS

Girifalco, "A Theory for the Estimation of Surface and Interfacial Energies. I. Derivation and Application to Interfacial Tension," The Journal of Physical Chemistry, Jul. 1957, vol. 61, pp. 904-909.
Koo, "A Snowman-like Array of Colloidal Dimers for Antireflecting Surfaces," Advanced Materials, Feb. 2004, vol. 16, No. 3, pp. 274-277.
Cassie, "Wettability of Porous Surfaces," Transactions of the Faraday Society, 1994, vol. 40, pp. 546-551.
Hattori, "Two-step assembly technique for preparation of polymer-particle composite films," Thin Solid Films, 2001, vol. 385, pp. 302-306.
Wenzel, "Resistance of Solid Surfaces to Wetting by Water," Industrial and Engineering Chemistry, 1936, Vo.28, No. 8, pp. 988-994.
Wang, "Light-induced amphiphilic surfaces," Nature, 1997, vol. 388, pp. 431-432.
Cassie, "Contact Angles," Discussions of the Faraday Society, 1948, vol. 3, pp. 11-16.
Hattori, "Anti-Reflection Surface with Particle Coating Deposited by Electrostatic Attraction," Advanced Materials, 2001, vol. 13, No. 1, pp. 51-54.
Lee, "All-Nanoparticle Thin-Film Coatings," Nano Letters, 2006, vol. 6, No. 10, pp. 2305-2312.
Nuraje, "Durable Antifog Films from Layer-by-Layer Molecularly Blended Hydrophilic Polysaccharides," Langmuir, 2011, vol. 27, No. 2, pp. 782-791.
Cebeci, "Nanoporosity-Driven Superhydrophilicity: A Means to Create Multifunctional Antifogging Coatings," Langmuir, 2006, vol. 22, pp. 2856-2862.
ASTM D257-07, Standard Test Methods for DC Resistance or Conductance of Insulating Materials, 2007, 18 pages.
Philipp, "Polysiloxane Derived From the Controlled Hydrolysis of Tetraethoxysilane as Precursors to Silica for Use in Ceramic Processing," NASA Technical Memorandum, 1990, 22 pages.
Stamate, "Application of Titanium Dioxide Photocatalysis to Create Self-Cleaning Materials," Romanian Technical Sciences Academy MOCM, 2007, vol. 3, pp. 280-285.

* cited by examiner

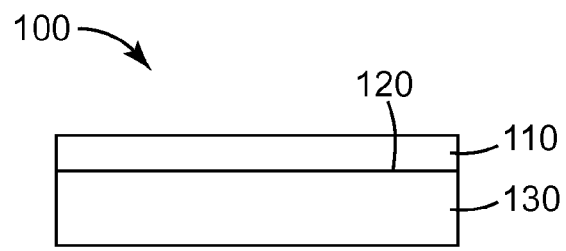

COATABLE COMPOSITION, ANTISTATIC COMPOSITION, ANTISTATIC ARTICLES, AND METHODS OF MAKING THE SAME

TECHNICAL FIELD

The present disclosure broadly relates to silica dispersions, articles having antistatic coatings thereon, and methods of making the foregoing.

BACKGROUND

Dissipation of static charge is important in many fields of endeavor, where it is desirable to prevent electrical surges/sparks resulting in damage to electrical components, or accidental ignition of volatile flammable vapors. Examples include electronic device (e.g., plasma display screen) manufacture, electronic component packaging, abrasive belts, and polymer film web handling.

To combat these problems, antistatic agents are commonly used. An antistatic agent is a compound used for treatment of materials or their surfaces in order to reduce or eliminate buildup of static electricity generally caused by the triboelectric effect. Its role is to make the surface or the material itself slightly conductive, either by being conductive itself, or by absorbing moisture from the air, so some humectants can be used. The molecules of an antistatic agent often have both hydrophilic and hydrophobic areas, similar to those of a surfactant; the hydrophobic side interacts with the surface of the material, while the hydrophilic side interacts with the air moisture and binds the water molecules.

There remains a need for additional materials that can reduce the accumulation of, and/or dissipate, static charge.

SUMMARY

The present disclosure provides compositions and methods that can produce antistatic coatings on articles, thereby ameliorating the above problems.

In one aspect the present disclosure provides a method of making a coatable composition, the method comprising:

providing a first composition comprising silica nanoparticles dispersed in an aqueous liquid medium, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size, and wherein the first composition has a pH greater than 6; and acidifying the first composition to a pH of less than or equal to 4 using inorganic acid to provide the coatable composition, wherein the coatable composition comprises agglomerated silica nanoparticles.

In another aspect, the present disclosure provides a coatable composition made according to the foregoing method of the present disclosure.

Coatable compositions according to the present disclosure are useful, for example, for making antistatic articles.

Accordingly, in yet another aspect, the present disclosure provides a method of making an antistatic article, the method comprising the steps:

a) providing a first composition comprising silica nanoparticles dispersed in an aqueous liquid medium, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size, and wherein and wherein the first composition has a pH greater than 6;

b) acidifying the first composition to a pH of less than or equal to 4 using inorganic acid to provide a coatable composition; and d) coating a layer of the coatable composition onto a surface of a substrate; and e) at least partially drying the layer of the coatable composition to provide an antistatic layer, wherein the antistatic layer has an average surface conductivity of less than or equal to $10^9$ ohms per square at 25° C. and 50 percent relative humidity.

In yet another aspect, the present disclosure provides an antistatic article made according to the foregoing method of the present disclosure.

In yet another aspect, the present disclosure provides an antistatic composition comprising an amorphous silica matrix, wherein the amorphous silica matrix comprises interconnected silica nanoparticles, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size.

In yet another aspect, the present disclosure provides an antistatic article comprising a layer of an amorphous antistatic composition disposed on a surface of a substrate, wherein the amorphous silica matrix comprises interconnected silica nanoparticles, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size.

In some embodiments, the amorphous antistatic composition further comprises metal cations, wherein a majority of the metal cations are individually disposed in the amorphous silica matrix, and wherein the metal cations comprise from 0.5 to 20.0 mole percent of the composition Advantageously, antistatic layers according to the present disclosure are typically transparent and unexpectedly exhibit good antistatic properties.

As used herein:

the term "antistatic article: refers to an article wherein at least a portion of a surface of the article has electrical charge dissipating properties;

the term "dispersion of silica nanoparticles" refers to a dispersion wherein individual silica nanoparticles are dispersed, and does not refer to a dispersion of fumed silica, which has sintered primary silica particles aggregated into chains.

the term "essentially free of" means containing less than one by percent by weight of, typically less than 0.1 percent by weight of, and more typically less than 0.01 percent by weight of;

the term "essentially free of non-volatile organic compounds" means containing less than one percent by weight of organic compounds having a boiling point above 150° Celsius at 1 atmosphere (100 kPa) of pressure;

the term "individually disposed in the amorphous silica matrix" in reference to metal cations means that the metal cations are bound through oxygen to silicon, and are not present as a discrete metal oxide phase;

the term "metal compound" means a compound containing at least one metal;

the term "nanoparticle" refers to a particle having a particle size of from 1 to 200 nanometers;

the term "organic compound" refers to any compound containing at least one carbon-carbon and/or carbon-hydrogen bond; and the term "silica", used in reference to silica nanoparticles and silica sols, refers to a compound represented by the molecular formula $SiO_2 \cdot n\, H_2O$, wherein n is a number greater than or equal to zero.

Features and advantages of the present disclosure will be further understood upon consideration of the detailed description as well as the appended claims.

BRIEF DESCRIPTION OF THE DRAWINGS

FIG. 1 is a schematic side view of an exemplary antistatic article 100 according to the present disclosure.

It should be understood that numerous other modifications and embodiments can be devised by those skilled in the art, which fall within the scope and spirit of the principles of the disclosure. The FIGURE may not be drawn to scale.

DETAILED DESCRIPTION

The initial composition comprises silica nanoparticles dispersed in an aqueous liquid medium, having a pH greater than 6.

The silica nanoparticles have a polymodal particle size distribution that comprises a first mode having a first particle size in the range of from 8 nanometers (nm) to 35 nm, and a second mode having a second particle size in the range of from 2 nm to 20 nm. The particle size of the first mode particle size is greater than that of the second mode. The average primary particle size may be determined, for example, using transmission electron microscopy. As used herein, the term "particle size" refers to the longest dimension of a particle, which is the diameter for a spherical particle.

In some embodiments, the particle size of the first mode is in the range of from 12 nm to 30 nm, or in the range of from 18 nm to 28 nm.

In some embodiments, including, for example, those of the preceding paragraph, the particle size of the second mode is in the range of from 3 nm to 18 nm, or in the range of from 4 nm to 12 nm.

Desirably each of the first and second modes has a narrow particle size distributions; for example, a polydispersity of 2.0 or less, or even 1.5 or less.

The initial composition may comprise any relative amounts of silica nanoparticles corresponding to the first and second modes, but desirably the silica nanoparticles corresponding to the first mode comprise from 1.0 to 99.5 percent by weight, more desirably from 5 to 90 percent by weight, and even more desirably from 20 to 80 percent by weight of the total amount of silica nanoparticles contained in the initial dispersion.

Of course, silica particles with a particle size greater than 200 nm (e.g., up to 2 micrometers in particle size) may also be included, but typically in a minor amount.

In some embodiments, the silica nanoparticles have a surface area greater than 150 square meters per gram ($m^2/g$), greater than 200 $m^2/g$, or even greater than 400 $m^2/g$.

In some embodiments, the amount of the silica nanoparticles having an average particle size (e.g., diameter) of 35 nm or less is at least 0.1 percent by weight, and desirably at least 0.2 percent by weight, based on the total weight of the initial composition and/or coatable composition. In some embodiments, the concentration of the silica nanoparticles having a particle size (e.g., diameter) of 35 nm or less is no greater than 20 percent by weight, or even no greater than 15 percent by weight, based on the total weight of the initial composition.

Nanoparticles (e.g., silica nanoparticles) included in the initial composition can be spherical or non-spherical with any desired aspect ratio. Aspect ratio refers to the ratio of the average longest dimension of the nanoparticles to their average shortest dimension. The aspect ratio of non-spherical nanoparticles is often at least 2:1, at least 3:1, at least 5:1, or at least 10:1. Non-spherical nanoparticles may, for example, have the shape of rods, ellipsoids, and/or needles. The shape of the nanoparticles can be regular or irregular. The porosity of coatings can typically be varied by changing the amount of regular and irregular-shaped nanoparticles in the coatable composition and/or by changing the amount of spherical and non-spherical nanoparticles in the coatable composition.

In some embodiments, the total weight of the silica nanoparticles in the initial composition is at least 0.1 percent by weight, typically at least 1 percent by weight, and more typically at least 2 percent by weight. In some embodiments, the total weight of the silica nanoparticles in the composition is no greater than 40 percent by weight, desirably no greater than 10 percent by weight, and more typically no greater than 7 percent by weight.

Silica sols, which are stable dispersions of silica nanoparticles in aqueous liquid media, are well-known in the art and available commercially. Non-aqueous silica sols (also called silica organosols) may also be used and are silica sol dispersions wherein the liquid phase is an organic solvent, or an aqueous mixture containing an organic solvent. In the practice of this disclosure, the silica sol is chosen so that its liquid phase is compatible with the dispersion, and is typically an aqueous solvent, optionally including an organic solvent. Typically, the initial composition does not include, or is essentially free of, fumed silica, although this is not a requirement.

Silica nanoparticle dispersions (e.g., silica sols) in water or water-alcohol solutions are available commercially, for example, under such trade names as LUDOX (marketed by E. I. du Pont de Nemours and Co., Wilmington, Del.), NYACOL (marketed by Nyacol Co., Ashland, Mass.), and NALCO (manufactured by Ondea Nalco Chemical Co., Oak Brook, Ill.). One useful silica sol is NALCO 2326, which is available as a silica sol with an average particle size of 5 nanometers, pH=10.5, and solid content 15 percent solids by weight. Other commercially available silica nanoparticles include those available under the trade designations NALCO 1115 (spherical, average particle size of 4 nm, 15 percent solids by weight dispersion, pH=10.4), NALCO 1130 spherical dispersion, average particle size of 8 nm, 30 percent solids by weight dispersion, pH=10.2), NALCO 1050 (spherical, average particle size 20 nm, 50 percent solids by weight dispersion, pH=9.0), NALCO 2327 (spherical, average particle size of 20 nm, 40 percent solids by weight dispersion, pH=9.3), NALCO 1030 (spherical, average particle size of 13 nm, 30 percent solids by weight dispersion, pH=10.2), Acicular silica nanoparticles may also be used provided that the average silica nanoparticle size constraints described hereinabove are achieved.

Useful acicular silica nanoparticles may be obtained as an aqueous suspension under the trade name SNOWTEX-UP by Nissan Chemical Industries (Tokyo, Japan). The mixture consists of 20-21% (w/w) of acicular silica, less than 0.35% (w/w) of $Na_2O$, and water. The particles are about 9 to 15 nanometers in diameter and have lengths of 40 to 200 nanometers. The suspension has a viscosity of <100 mPa at 25° C., a pH of about 9 to 10.5, and a specific gravity of about 1.13 at 20° C.

Other useful acicular silica nanoparticles may be obtained as an aqueous suspension under the trade name SNOWTEX-PS-S and SNOWTEX-PS-M by Nissan Chemical Industries, having a morphology of a string of pearls. The mixture consists of 20-21% (w/w) of silica, less than 0.2% (w/w) of $Na_2O$, and water. The SNOWTEX-PS-M particles are about 18 to 25 nanometers in diameter and have lengths of 80 to 150 nanometers. The particle size is 80 to 150 by dynamic light scattering methods. The suspension has a viscosity of <100 mPas at 25° C., a pH of about 9 to 10.5, and a specific gravity of about 1.13 at 20° C. The SNOWTEX-PS-S has a particle diameter of 10-15 nm and a length of 80-120 nm.

Low- and non-aqueous silica sols (also called silica organosols) may also be used and are silica sol dispersions wherein the liquid phase is an organic solvent, or an aqueous organic solvent. In the practice of the present disclosure, the silica nanoparticle sol is chosen so that its liquid phase is compatible with the intended coating composition, and is typically aqueous or a low-aqueous organic solvent.

Silica sols having a pH of at least 8 can also be prepared according to the methods described in U.S. Pat. No. 5,964, 693 (Brekau et al.).

Optionally, the initial composition can further include other nanoparticles, including, for example, nanoparticles comprising aluminum oxide, titanium oxide, tin oxide, antimony oxide, antimony-doped tin oxide, indium oxide, tin-doped indium oxide, or zinc oxide.

The initial composition has a pH greater than 6, more typically greater than 7, more typically greater than 8, and even more typically greater than 9.

In some embodiments, the initial composition is essentially free of non-volatile organic compounds. In some embodiments, the initial composition is essentially free of organic surfactants.

The aqueous liquid medium of the initial composition may comprise (in addition to water) at least one volatile organic solvent. Examples of suitable volatile organic solvents include those volatile organic solvents that are miscible with water such as, e.g., methanol, ethanol, isopropanol, and combinations thereof. However, for many applications, reduction or elimination of volatile organic compounds will be desirable, and advantageously the present disclosure may be practiced using initial compositions and/or coatable compositions that are essentially free of volatile organic solvent.

The initial composition is acidified by addition of inorganic acid until it has a pH of less than or equal to 4, typically less than 3, or even less than 2 thereby providing the coatable composition. Useful inorganic acids (i.e., mineral acids) include, for example, hydrochloric acid, nitric acid, sulfuric acid, phosphoric acid, perchloric acid, chloric acid, and combinations thereof. Typically, the inorganic acid is selected such that it has a $pK_a$ of less than or equal to two, less than one, or even less than zero, although this is not a requirement. Without wishing to be bound by theory, the present inventors believe that some agglomeration of the silica nanoparticles occurs as the pH falls, resulting in a dispersion comprising slightly agglomerated nanoparticles.

At this stage, at least one metal compound (e.g., a transition metal compound and/or a metal compound), may optionally be combined with (e.g., dissolved in) the acidified composition thereby providing the coatable composition, generally with mixing. Combination of the various ingredients in the above compositions may be carried out using any suitable mixing technique. Examples include stirring, shaking, and otherwise agitating the composition during or after addition of all components of the composition.

The metal compound (and any metal cations contained therein) may comprise a metal (or metal cation) in any of groups 2 through 15 (e.g., group 2, group 3, group 4, group 5, group 6, group 7, group 8, group 9, group 10, group 11, group 12, group 13, group 14, group 15, and combinations thereof) of the Periodic Table of the Elements.

The metal cation(s) contained in the metal compound(s) may have a charge of +1, +2, +3, or +4, for example. In some embodiments, the metal compound may be a metal compound having a charge of ≥2+(e.g., 2+, 3+, 4+, 5+, or 6+). Examples of useful metal compounds include copper compounds (e.g., $CuCl_2$), platinum compounds (e.g., $H_2PtCl_6$), aluminum compounds (e.g., $Al_2(SO_4)_3$), zirconium compounds (e.g., $ZrCl_4$ or $ZrOCl_2.8 H_2O$), titanium compounds (e.g., $TiOSO_4.2H_2O$), zinc compounds (e.g. $Zn(NO_3)_6.6H_2O$), iron compounds, tin compounds (e.g., $SnCl_2$), and combinations thereof. In some embodiments, the metal cation(s) is/are not alkali metal cation(s) and/or alkaline earth cation(s).

Coatable compositions according to the present disclosure may further comprise one or more optional additives such as, for example, colorant(s), surfactant(s), thickener(s), thixotrope(s), or leveling aid(s).

In some embodiments, the coatable composition may comprise an added surfactant, however, the inventors have unexpected discovered that coatable compositions according to the present disclosure wet out at least some hydrophobic surfaces without added surfactant.

The coatable composition may comprise from 30 to 99 percent by weight of silica, desirably from 60 to 97.5 percent by weight of silica, more desirably from 80 to 95 percent by weight of silica, although other amounts may also be used.

Similarly, the coatable composition may comprise from 0.2 to 20 percent by mole of metal cations contained in the metal compound(s), desirably from 0.5 to 10 percent by mole of metal cations, more desirably from 2 to 5 percent by mole of metal cations, although other amounts may also be used.

Once made, the coating composition is typically stable over long periods of time, over a range of temperatures, although this is not a requirement. The coating composition may be coated onto a substrate and at least partially dried, typically substantially completely dried. Without wishing to be bound by theory, the present inventors believe that during the drying process, condensation processes lead to chemical bonding between the silica nanoparticles and/or agglomerates at points of contact to form a silica matrix. Metal cations that may be present may be individually incorporated into the silica matrix, resulting in an amorphous composition.

The coatable composition can be contacted with a surface of a substrate and at least partially dried to form an antistatic article. Unexpectedly, the present inventors have discovered that coatable compositions according to the present disclosure can be contacted with a surface of a substrate and at least partially dried to provide a defect-free layer with unexpected antistatic properties, even when substantially free of added metal cations. Suitable methods of drying the coatable composition include, for example, evaporation in air at about room temperature, ovens, heated air blowers, infrared heaters, and hot cans. Drying is typically carried out until the coatable composition is substantially completely dry, although this is not a requirement. Once contacted with the substrate and at least partially dried, the antistatic layer may be aged for a period of time such as for example, at least 1 hour (hr), at least 4 hrs, at least 8 hrs, at least 24 hrs, at least 72 hrs, at least 1 week, or even at least 2 weeks, during which time the electrical conductivity of the antistatic layer may improve.

While the antistatic layer has an average surface conductivity of less than or equal to $10^9$ ohms per square at 25° C. and 50 percent relative humidity, in some embodiments, it may have a surface conductivity of less than or equal to $5\times10^8$ ohms per square, less than $2\times10^8$, or even less than $8\times10^7$ ohms per square. Average surface conductivity can be determined according to ASTM D-257-07 "Standard Test Methods for DC Resistance or Conductance of Insulating Materials".

Referring now to FIG. 1, antistatic article 100 comprises antistatic layer 110 disposed on surface 120 of substrate 130. Examples of suitable methods of contact the coatable composition with the surface of the substrate include roll coating, spray coating, gravure coating, dip coating, and curtain coating. Typically, the antistatic layer has a thickness in the range of from 0.02 to 100 microns, desirably 0.05 to 5 microns, although this is not a requirement.

Typically, antistatic layers according to the present disclosure are at least substantially transparent; however this is not a requirement.

Examples of suitable substrates include virtually any dimensionally-stable material. Examples include glass substrates (e.g., mirrors, windows, windshields, tables, lenses, and prisms), metal substrates, ceramic substrates, organic polymer substrates (e.g., molded polymer articles, automotive paints and clearcoats, polymer films, retroreflective sheeting, indoor signage, and outdoor signage), and fabric (e.g., upholstery fabric). In some embodiments, the substrate comprises at least one of glass or an organic polymer. In some embodiments, the organic polymer comprises at least one of a polyester (e.g., polyethylene terephthalate or polybutylene terephthalate), polycarbonate, allyldiglycol carbonate, acrylics (e.g., polymethyl methacrylate (PMMA)), polystyrene, polysulfone, polyether sulfone, homo-epoxy polymers, epoxy addition polymers with polydiamines and/or polydithiols, polyamides (e.g., nylon 6 and nylon 6,6), polyimides, polyolefins (e.g., polyethylene and polypropylene), olefinic copolymers (e.g., polyethylene copolymers), and cellulose esters (e.g., cellulose acetate and cellulose butyrate), and combinations thereof.

Select Embodiments of the Present Disclosure

In a first embodiment, the present disclosure provides a method of making a coatable composition, the method comprising:

providing a first composition comprising silica nanoparticles dispersed in an aqueous liquid medium, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size, and wherein the first composition has a pH greater than 6; and acidifying the first composition to a pH of less than or equal to 4 using inorganic acid to provide the coatable composition, wherein the coatable composition comprises agglomerated silica nanoparticles.

In a second embodiment, the present disclosure provides a method according to the first embodiment, further comprising dissolving at least one metal compound in the coatable composition.

In a third embodiment, the present disclosure provides a method according to the first or second embodiment, wherein the coatable composition is essentially free of organic non-volatile compounds.

In a fourth embodiment, the present disclosure provides a coatable composition made according to the method of any one of the first to third embodiments.

In a fifth embodiment, the present disclosure provides a method of making an antistatic article, the method comprising the steps:

a) providing a first composition comprising silica nanoparticles dispersed in an aqueous liquid medium, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size, and wherein and wherein the first composition has a pH greater than 6;

b) acidifying the first composition to a pH of less than or equal to 4 using inorganic acid to provide a coatable composition; and d) coating a layer of the coatable composition onto a surface of a substrate; and e) at least partially drying the layer of the coatable composition to provide an antistatic layer, wherein the antistatic layer has an average surface conductivity of less than or equal to $10^9$ ohms per square at 25° C. and 50 percent relative humidity.

In a sixth embodiment, the present disclosure provides a method according to the fifth embodiment, further comprising dissolving at least one metal compound in the coatable composition.

In a seventh embodiment, the present disclosure provides a method according to the sixth embodiment, wherein said at least one metal compound is selected from the group consisting of manganese compounds, silver compounds, vanadium compounds, tin compounds, platinum compounds, and combinations thereof.

In an eighth embodiment, the present disclosure provides a method according to the sixth or seventh embodiment, wherein said at least one metal compound is selected from the group consisting of silver compounds, vanadium compounds, and combinations thereof.

In a ninth embodiment, the present disclosure provides a method according to any one of the fifth to eighth embodiments, wherein the substrate comprises at least one of glass or an organic polymer.

In a tenth embodiment, the present disclosure provides a method according to the ninth embodiment, wherein the organic polymer comprises polyethylene terephthalate.

In an eleventh embodiment, the present disclosure provides a method according to any one of the fifth to tenth embodiments, wherein the antistatic layer is optically clear.

In a twelfth embodiment, the present disclosure provides a method according to any one of the fifth to eleventh embodiments, wherein the antistatic layer has a thickness in a range of from 0.02 to 100 microns.

In a thirteenth embodiment, the present disclosure provides a method according to any one of the sixth to twelfth embodiments, wherein the inorganic acid has a $pK_a$ of less than or equal to zero.

In a fourteenth embodiment, the present disclosure provides a method according to any one of the fifth to thirteenth embodiments, wherein step b) comprises acidifying the first composition to a pH of less than or equal to 2.

In a fifteenth embodiment, the present disclosure provides a method according to any one of the fifth to fourteenth embodiments, wherein the coatable composition is essentially free of organic non-volatile compounds.

In a sixteenth embodiment, the present disclosure provides an antistatic article made according to the method of any one of the fifth to fifteenth embodiments.

In a seventeenth embodiment, the present disclosure provides an antistatic composition comprising an amorphous silica matrix, wherein the amorphous silica matrix comprises interconnected silica nanoparticles, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size.

In an eighteenth embodiment, the present disclosure provides an antistatic composition according to the seventeenth embodiment, further comprising metal cations, wherein a majority of the metal cations are individually disposed in the amorphous silica matrix, and wherein the metal cations comprise from 0.5 to 20 mole percent of the total combined moles of silicon and metal cations in the composition.

In a nineteenth embodiment, the present disclosure provides an antistatic composition according to the eighteenth embodiment, wherein the metal cations are selected from the group consisting of manganese cations, silver cations, vanadium cations, tin cations, platinum cations, and combinations thereof.

In a twentieth embodiment, the present disclosure provides an antistatic composition according to the eighteenth or nineteenth embodiment, wherein the metal cations are selected from the group consisting of silver cations, vanadium cations, and combinations thereof.

In a twenty-first embodiment, the present disclosure provides an antistatic composition according to any one of the seventeenth to twentieth embodiments, wherein the antistatic composition is essentially free of organic non-volatile compounds.

In a twenty-second embodiment, the present disclosure provides an antistatic article comprising a layer of an amorphous antistatic composition disposed on a surface of a substrate, wherein the amorphous silica matrix comprises interconnected silica nanoparticles, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size.

In a twenty-third embodiment, the present disclosure provides an antistatic article according to the twenty-second embodiment, wherein the amorphous antistatic composition further comprises metal cations, wherein a majority of the metal cations are individually disposed in the amorphous silica matrix, and wherein the metal cations comprise from 0.5 to 20 mole percent of the total combined moles of silicon and metal cations in the composition.

In a twenty-fourth embodiment, the present disclosure provides an antistatic article according to the twenty-third embodiment, wherein the metal cations are selected from the group consisting of manganese cations, silver cations, vanadium cations, tin cations, platinum cations, and combinations thereof.

In a twenty-fifth embodiment, the present disclosure provides an antistatic article according to any one of the twenty-third of twenty-fourth embodiments, wherein the metal cations are selected from the group consisting of silver cations, vanadium cations, and combinations thereof.

In a twenty-sixth embodiment, the present disclosure provides an antistatic article according to any one of the twenty-second to twenty-fifth embodiments, wherein the substrate comprises glass or an organic polymer.

In a twenty-seventh embodiment, the present disclosure provides an antistatic article according to any one of the twenty-second to twenty-sixth embodiments, wherein the organic polymer comprises polyethylene terephthalate.

In a twenty-eighth embodiment, the present disclosure provides an antistatic article according to any one of the twenty-second to twenty-seventh embodiments, wherein the antistatic layer is optically clear.

In a twenty-ninth embodiment, the present disclosure provides an antistatic article according to any one of the twenty-second to twenty-eighth embodiments, wherein the antistatic layer has a thickness in a range of from 0.02 to 100 microns.

In a thirtieth embodiment, the present disclosure provides an antistatic article according to any one of the twenty-second to twenty-ninth embodiments, wherein the coatable composition is essentially free of organic non-volatile compounds.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples are by weight.

Silica nanoparticle dispersions NALCO 1115 (4 nm), NALCO 1050 (20 nm), NALCO 2327 (20 nm) and NALCO 2329 (75 nm) were obtained from the Nalco Company, Naperville, Ill. under the trade designations NALCO 1115, NALCO 1050, and NALCO 2327, respectively.

NALCO DVNZ004 CATALYST SUPPORT (45 nm) and NALCO 8699 (2-4 nm) are amorphous silica dispersions obtained from Nalco Company.

NALCO 8691 (2 nm) retention and drainage aid was obtained from Nalco Company under the trade designation ULTRA POSITEK 8691.

REMASOL OLLOIDAL SILICA SP-30 (8-9 nm) is an amorphous silica dispersion obtained from REMET Corporation, Utica, N.Y.

$TiOSO_4.2H_2O$ was obtained from NOAH Technologies Corporation, San Antonio, Tex.

$Zn(NO_3)_2.6H_2O$ was obtained from Mallinckrodt Baker, Inc., Phillipsburg, N.J.

$Cu(NO_3)_2.3H_2O$ was obtained from Morton Thiokol Inc., Danvers, Mass.

$Mn(NO_3)_2.xH_2O$ (x=4-6) was obtained from Sigma-Aldrich Co., Saint Louis, Mo.

$AgNO_3$ was obtained from Sigma-Aldrich Co.

$VOSO_4.xH_2O$ (x=3-5) was obtained from Sigma-Aldrich Co.

$H_2PtCl_6.6H_2O$ was obtained from Sigma-Aldrich Co.

$FeCl_3.6H_2O$ was obtained from Sigma-Aldrich Co.

$SnCl_4.5H_2O$ was obtained from Sigma-Aldrich Co.

$SbCl_3$ was obtained from Sigma-Aldrich Co.

Polyethylene terephthalate (PET) film (50 micrometer thick) was obtained from E.I. DuPont de Nemours, Wilmington, Del. under the trade designation MELINEX 618.

Poly(methyl methacrylate) (PMMA) film was obtained 3M, St. Paul, Minn. under the trade designation SCOTCH-PAK Heat Sealable Polyester Film.

Regular glass slides were obtained from VWR international, West Chester, Pa. and SOLITE glass was obtained from Swift Glass Inc., Elmira Heights, N.Y. under the trade designation SOLITE. These glass slides were pretreated by gentle scrubbing with ALCONOX cleanser from VWR International, West Chester, Pa. under trade designation ALCONOX and subsequently washed thoroughly with de-ionized (DI) water before use.

Test Method for Evaluating the Surface Resistivity

The samples prepared according to the Examples and Comparative Examples described below were evaluated for their surface resistivity using a Keithley Model 8009 Resistivity test fixture (Keithley Instruments, Inc., Cleveland, Ohio) with compressible conductive rubber electrodes and 1 lb (0.45 kg) electrode force over approximately 2.5 square inches ($16 cm^2$) of electrode and sample. The test fixture was conformed to ASTM D-257-07 "Standard Test Methods for DC Resistance or Conductance of Insulating Materials". The measurement threshold of surface resistance is between $10^{15}$ and $10^{16}$ ohms/square, so that only values reported below $10^{15}$ ohms per square ($\Omega$/square) are quantitative. Average surface conductivity was determined as an average of three collected data points.

The samples were also measured for the surface resistivity using a Monroe Electronics 272A PORTABLE SURFACE RESISTIVITY METER (purchased from Monroe Electronics, Inc., Lyndonville N.Y.) according to ASTM D-257-07 "Standard Test Methods for DC Resistance or Conductance of Insulating Materials". The surface resistivity was measured at an applied voltage of 100 V using a Monroe Model 96101A-1 guarded ring-type electrode system. Coatings were stored in a controlled temperature and humidity room at 23° C. and 50% RH overnight or at ambient conditions (20° C. and 20% RH) overnight before measuring surface resistivity. The upper limit of surface resistivity measurable by the instrument was $2\times10^{14}$ $\Omega$/square ($\Omega$/sq). If the surface resistivity of a coating exceeded this value, a value of $2\times10^{14}$ $\Omega$/sq was recorded. Average surface conductivity was determined as an average of three collected data points.

Comparative Example A

Comparative Example A was a bare PET substrate (50 micrometer thick polyethylene terephthalate film obtained from E.I. du Pont de Nemours and Co., Wilmington, Del. under the trade designation MELINEX 618), which was used as received without further treatments or coatings.

Comparative Example B

Comparative Example B was prepared by coating a PET substrate (50 micrometer thick polyethylene terephthalate film obtained from E.I. du Pont de Nemours and Co. under the trade designation MELINEX 618) with NALCO 8691 silica sol dispersion which was diluted to 10 wt. % solids using deionized water, and acidified to pH=2 using concentrated $HNO_3$. Coating of silica sol dispersions were accomplished using a #12 wire-wound coating rod (from RD Specialties, Webster, N.Y., nominal wet coating thickness=28 microns). The coated samples were dried at room temperature and then further cured at 120° C. for 10 minutes. The final samples were optically clear and transparent.

Comparative Example C

Comparative Example C was prepared in the same manner as Comparative Example B, except that the silica sol dispersion was NALCO 8699.

Comparative Example D

Comparative Example D was prepared in the same manner as Comparative Example B, except that the silica sol dispersion was NALCO 1115.

Comparative Example 1

Example 1 was prepared in the same manner as Comparative Example B, except that the silica dispersion was a mixture of NALCO 8699 and NALCO 2327 at a 3:7 weight (wt.) ratio.

Comparative Example 2

Example 2 was prepared in the same manner as Comparative Example B, except that the silica dispersion was a mixture of NALCO 1115 and REMASOL SP-30 at a 3:7 wt. ratio.

Comparative Example 3

Example 3 was prepared in the same manner as Comparative Example B, except that the silica sol dispersion was 10 wt. % of a mixture of NALCO 1115 and NALCO 1050 at a 3:7 wt. ratio. The coating was accomplished using a #6 wire-wound coating rod (nominal wet coating thickness=14 microns).

Comparative Example 4

Example 4 was prepared in the same manner as Comparative Example B, except that the silica sol dispersion was a mixture of REMASOL SP-30 and NALCO 1050 at a 3:7 wt. ratio.

Comparative Example 5

Example 5 was prepared in the same manner as Comparative Example B, except that the silica sol dispersion was a mixture of NALCO 1115 and NALCO DVNZ004 at a 3:7 wt. ratio.

The Example 1-5 and Comparative Examples A-D samples thus prepared were tested for surface conductivity according to the TEST METHOD FOR EVALUATING THE SURFACE RESISTIVITY. Results are reported below in Table 1 (below).

TABLE 1

| COATING COMPOSITION EXAMPLE | AVERAGE SURFACE RESISTIVITY ohms/square | TEMPERATURE, °C. | RELATIVE HUMIDITY, % |
|---|---|---|---|
| Comp. Ex. A | $2.23 \times 10^{16}$ | 23 | 50 |
| Comp. Ex. B | $2.00 \times 10^{14}$ | 23 | 50 |
| Comp. Ex. C | $1.10 \times 10^{7}$ | 23 | 50 |
| 1 | $4.50 \times 10^{7}$ | 23 | 50 |
| Comp. Ex. D | $3.23 \times 10^{14}$ | 23 | 50 |
| 2 | $3.50 \times 10^{11}$ | 23 | 50 |
| 3 | $3.62 \times 10^{8}$ | 23 | 50 |
| 4 | $1.26 \times 10^{9}$ | 23 | 50 |
| 5 | $5.37 \times 10^{8}$ | 21 | 30 |
| 5 | $5.14 \times 10^{8}$ | 21 | 50 |
| 5 | $6.30 \times 10^{8}$ | 60 | 90 |

Examples 6-14

Example 6-14 samples were prepared in the same manner as Example 3, except that the diluted and acidified silica sol dispersions were further modified by adding various metals. The type and amount of the metals added to the silica sol dispersions of each of Examples 6-14 are reported in Table 2. The source of metals (i.e., metal compounds) for Examples 6-14 were aqueous solutions of 10 weight percent (wt. %) $Mn(NO_3)_2 \cdot xH_2O$, 10 wt. %, $AgNO_3$, 10 wt %, $VOSO_4 \cdot xH_2O$, 10 wt. % $Cu(NO_3)_2 \cdot 3H_2O$, 10 wt. %, $H_2PtCl_6 \cdot 6H_2O$, 10 wt. % $Zn(NO_3)_2 \cdot 6H_2O$, 5 wt. % $TiOSO_4 \cdot 2H_2O$, 5 wt. %, $FeCl_3 \cdot 6H_2O$, 3.38 wt. %, $SnCl_4 \cdot 5H_2O$. Examples 6-14 were prepared by coating metal doped silica sol dispersion on PET substrates with a #6 wire-wound coating rod (nominal wet coating thickness=14 microns). The final coated samples were optically clear and transparent. The Examples thus prepared were tested for surface conductivity according to the TEST METHOD FOR EVALUATING THE SURFACE RESISTIVITY. Results are reported in Table 2.

Examples 15-17

Example 15-17 samples were prepared in the same manner as Example 5, except that the diluted and acidified silica sol dispersions were further modified by adding various metal cations. The type and amount of the metal cations added to the silica sol dispersions of each of Examples 15-17 are summarized in Table 2, below. The source of metals (i.e., metal compounds) for Examples 15-17 were aqueous solutions of 10 wt. % $Cu(NO_3)_2 \cdot 3H_2O$, 10 wt. % $TiOSO_4 \cdot 2H_2O$, 10 wt. %, $SbCl_3$. The final coated samples were optically clear and transparent.

The Examples thus prepared were tested for surface conductivity according to the TEST METHOD FOR EVALUATING THE SURFACE RESISTIVITY. Results are reported in Table 2 (below).

TABLE 2

| COATING COMPOSITION EXAMPLE | METAL COMPOUND | METAL COMPOUND (weight percent of total solids) | AVERAGE SURFACE RESISTIVITY AT 23° C. AND 50% RELATIVE HUMIDITY, Ohms/square |
|---|---|---|---|
| 6 | $Mn(NO_3)_2 \cdot xH_2O$ | 20.0 | $2.30 \times 10^{8}$ |
| 7 | $AgNO_3$ | 20.0 | $7.57 \times 10^{7}$ |
| 8 | $VOSO_4 \cdot xH_2O$ | 20.0 | $9.73 \times 10^{7}$ |
| 9 | $Cu(NO_3)_2 \cdot 3H_2O$ | 20.0 | $5.07 \times 10^{8}$ |
| 10 | $H_2PtCl_6 \cdot 6H_2O$ | 20.0 | $1.62 \times 10^{8}$ |
| 11 | $Zn(NO_3)_2 \cdot 6H_2O$ | 20.0 | $7.31 \times 10^{8}$ |
| 12 | $TiOSO_4 \cdot 2H_2O$ | 20.0 | too low to measure |
| 13 | $FeCl_3 \cdot 6H_2O$ | 10.0 | $4.31 \times 10^{8}$ |
| 14 | $SnCl_4 \cdot 5H_2O$ | 7.0 | $2.95 \times 10^{8}$ |
| 15 | $Cu(NO_3)_2 \cdot 3H_2O$ | 2.5 | $9.41 \times 10^{8}$ |
| 16 | $SbCl_3$ | 2.5 | $9.29 \times 10^{8}$ |
| 17 | $TiOSO_4 \cdot 2H_2O$ | 10.0 | $4.43 \times 10^{8}$ |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method comprising:
    providing a first composition comprising silica nanoparticles dispersed in an aqueous liquid medium, wherein the silica nanoparticles have a polymodal particle size distribution, wherein the polymodal particle size distribution comprises a first mode having a first particle size in the range of from 8 to 35 nanometers, wherein the polymodal particle size distribution comprises a second mode having a second particle size in the range of from 2 to 20 nanometers, wherein the first particle size is greater than the second particle size, and wherein the first composition has a pH greater than 6;
    acidifying the first composition to a pH of less than or equal to 4 using inorganic acid to provide a coatable composition, wherein the coatable composition comprises agglomerated silica nanoparticles; and
    dissolving at least one metal compound in the coatable composition, wherein said at least one metal compound is selected from the group consisting of manganese compounds, silver compounds, vanadium compounds, tin compounds, platinum compounds, and combinations thereof.

2. The method of claim 1, wherein the coatable composition is essentially free of organic non-volatile compounds.

* * * * *